Figure 2:
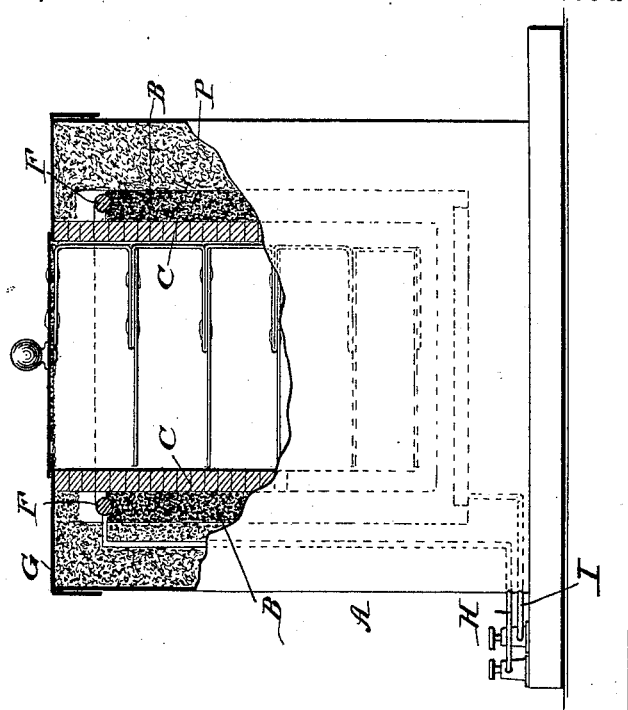

(No Model.)

J. R. DAVIS.
ELECTRIC HEATER.

No. 527,324. Patented Oct. 9, 1894.

Solidified mixture of graphite with non combustible and non conducting material

WITNESSES:
Fred G. Dieterich
Edw. W. Byrn.

INVENTOR
Jesse R. Davis.
BY Munn & Co
ATTORNEYS.

UNITED STATES PATENT OFFICE.

JESSE R. DAVIS, OF PARKERSBURG, WEST VIRGINIA, ASSIGNOR OF ONE-THIRD TO CHARLES A. WADE, OF SAME PLACE.

ELECTRIC HEATER.

SPECIFICATION forming part of Letters Patent No. 527,324, dated October 9, 1894.

Application filed February 24, 1894. Serial No. 501,352. (No model.)

*To all whom it may concern:*

Be it known that I, JESSE R. DAVIS, of Parkersburg, in the county of Wood and State of West Virginia, have invented a new and useful Improvement in Electric Heaters, of which the following is a specification.

The object of my invention is to provide a simple, cheap and effective electric heater, for converting an electric current into sensible heat without the use of wire coils, for utilization in the arts in various ways, which device shall be perfectly durable, and stable, so as to require no renewal or attention, and suffer no depreciation.

My invention consists in the peculiar construction and arrangement of electrodes in combination with the other parts of the furnace or stove and a heating medium as hereinafter described, said construction being designed to heat a central chamber, as for raising steam in a steam boiler or heating an oven.

The heating medium I prefer to employ and which is made hot by the passage of the electric current through it, is composed of finely comminuted carbon particles such as pulverized plumbago or graphite, mixed in varying proportions with an inert refractory non-combustible material, which is also a non-conductor of electricity, so that when the electric current is passed through this mixture, the mass is rendered partly conductive by the distribution of carbon particles through it, but is of high resistance because of the admixture and preponderance of the non-combustible non-conducting inert material in which the carbon particles are homogeneously embedded. The inert material may be composed of slaked lime, magnesia, alumina, silica, oxide of iron, tourmaline, lava, slag, mineral wool, pulverized coal ashes, fire clay, asbestos, or a mixture of any of these.

The carbon particles are to be mixed with the above material as homogeneously as possible, and sufficient water is added to form a mortar or plastic mass which subsequently hardens and becomes solid. When greater tenacity is desired, with the mortar thus formed a proportion of asbestos, mineral wool, or other fibrous inert material is added which is not destroyed by the action of heat. The proportion of the materials is: to every one hundred parts (by volume) of inert material, from one to forty-seven parts of carbon, the proportion varying according to the application to be made of the heat. Thus for slight warming purposes a very small per cent. of carbon is used, while for other purposes where a high degree of heat is required, the largest proportion of carbon is used, and this is sufficient to produce incandescence in the mass.

Figure 1:
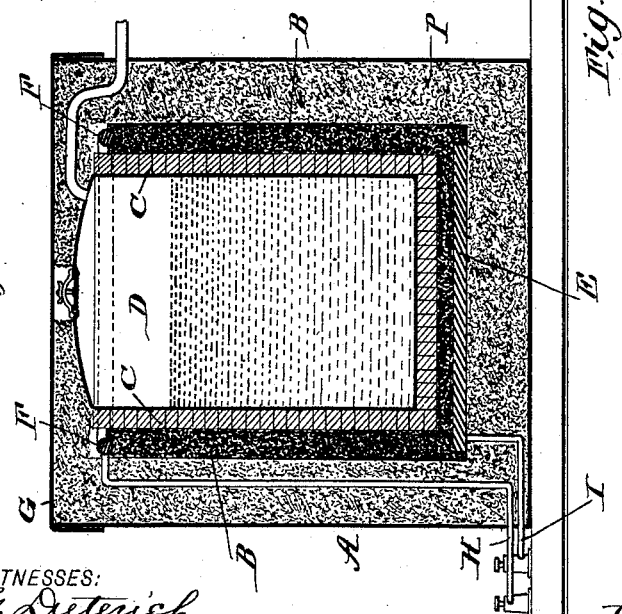
Figure 3:
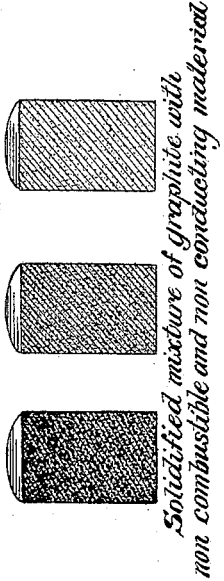

Figure 1 is a vertical central section of a heating furnace for raising steam in a steam boiler. Fig. 2 is a similar view of a heating furnace adapted for culinary uses, and Fig. 3 are sectional views of masses of the heating medium as composed of a heterogeneous mixture of carbon particles, and inert material in varying proportions of carbon.

In the drawings A is the outer casing of an upright cylindrical shape.

D is the shell of a steam boiler which is arranged centrally within the outer casing.

B is the heat generating medium composed of a mixture of comminuted carbon particles with one or more of the inert materials named which is mixed together with water to form a mortar that sets to a solid mass when dry. This compound entirely surrounds the sides and bottom of the boiler. Between this heating medium and the metal shell of the boiler is interposed a layer C of some substance which is a good non-conductor of electricity, and is also a heat resisting body. I prefer fire brick for this purpose as shown. It is necessary that this should be a non-conductor of electricity because if the current of electricity were permitted to reach the metal shell of the boiler the current would pass by that route, without being transformed into heat, instead of through the heating medium, and this coating to the boiler must also be a heat resisting medium to withstand the high degree of heat generated within the heating material B. Outside of the heating medium B is a thick packing P of any good non-conductor of heat, and electricity, any of the inert substances named being used for this purpose. This packing insulates the current and keeps it within the heating medium B, and also conserves the heat by preventing loss from external radiation.

To apply the electrical current, an electrode consisting of a cast iron plate E is embedded at the bottom of the mass B of the heating medium, and another electrode consisting of a cast iron ring F is allowed to rest upon the top of the heating medium. These two electrodes are connected by wires H and I to binding posts which receive the current from the wires of any system of distribution from dynamo electric machines or storage batteries.

The object in making the upper electrode in the form of a ring is to give access to the central heating chamber, and to permit this electrode to settle down or gravitate always to a close contact with the heating material as it shrinks from successive heating and cooling.

When the current is turned on the resistance of the heating medium causes it to become hot depending in degree upon the relative proportion of plumbago and inert material, and the heat so generated is utilized either for raising steam as in Fig. 1, or for the purposes of cooking as in Fig. 2.

By merely regulating the proportion of carbon to the inert material, the proportion of heat developed may be adapted to various uses.

Having thus described my invention, what I claim as new, and desire to secure by Letters Patent, is—

1. In an electric heater having a heat resisting medium composed of electrically conductive carbon particles mixed with non-combustible and non-conductive material, the combination with said heating medium and its insulating layers or walls; of two electrodes one constructed as a plate at the bottom of the heating medium, and the other constructed as a gravitating ring-shaped electrode arranged at the top of said heating medium substantially as and for the purpose described.

2. In an electric heater having an annular heat resisting medium comprised of electrically conductive carbon particles mixed with non-combustible and non-conductive material, the combination with said heating medium and its insulating layers or walls constructed to form a central heating chamber with an opening at the top; of two electrodes one constructed as a plate and placed at the bottom of the heating medium and extending beneath the central chamber, and the other constructed as a gravitating ring-shaped electrode placed at the top of the heating medium and surrounding the central chamber substantially as shown and described.

JESSE R. DAVIS.

Witnesses:
EDWD. W. BYRN,
SOLON C. KEMON.